(12) United States Patent
Frick

(10) Patent No.: US 9,874,915 B2
(45) Date of Patent: Jan. 23, 2018

(54) EXTENDED FILE ATTRIBUTES FOR REDUNDANT DATA STORAGE

(71) Applicant: Seagate Technology LLC, Cupertino, CA (US)

(72) Inventor: Guy David Frick, Lafayette, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 122 days.

(21) Appl. No.: 14/740,031

(22) Filed: Jun. 15, 2015

(65) Prior Publication Data

US 2015/0363127 A1 Dec. 17, 2015

Related U.S. Application Data

(60) Provisional application No. 62/012,205, filed on Jun. 13, 2014, provisional application No. 62/012,219, filed on Jun. 13, 2014.

(51) Int. Cl.
*G06F 12/00* (2006.01)
*G06F 12/02* (2006.01)
(Continued)

(52) U.S. Cl.
CPC .............. *G06F 1/28* (2013.01); *G06F 1/3203* (2013.01); *G06F 1/3221* (2013.01); *G06F 1/3287* (2013.01); *G06F 3/0604* (2013.01); *G06F 3/0619* (2013.01); *G06F 3/0625* (2013.01); *G06F 3/0634* (2013.01); *G06F 3/0635* (2013.01); *G06F 3/0658* (2013.01); *G06F 3/0659* (2013.01); *G06F 3/0665* (2013.01); *G06F 3/0685* (2013.01); *G06F 3/0689* (2013.01); *G06F 11/2015* (2013.01);
(Continued)

(58) Field of Classification Search
CPC .... G06F 11/2015; G06F 11/2094; G06F 1/28; G06F 1/3203; G06F 1/3221; G06F 1/3287; G06F 2201/805; G06F 3/0604; G06F 3/0619; G06F 3/0625; G06F 3/0634; G06F 3/0635; G06F 3/0658; G06F 3/0659
See application file for complete search history.

(56) References Cited

U.S. PATENT DOCUMENTS

| 5,504,882 A | 4/1996 | Chai et al. |
| 5,778,374 A | 7/1998 | Dang et al. |
(Continued)

FOREIGN PATENT DOCUMENTS

WO 2014-065841 A1 5/2014

OTHER PUBLICATIONS

Caulfield, et al., "Moneta: A High-performance Storage Array Architecture for Next-generation, Non-volatile Memories," Dept. of Computer Science & Engineering, U.C. San Diego, California, 2010, 11 pages.
(Continued)

*Primary Examiner* — Yong Choe
(74) *Attorney, Agent, or Firm* — Holzer Patel Drennan

(57) ABSTRACT

A mass data storage system includes a data manager that selects a subset of storage resources for storage of a data file and generates location metadata for the data file defining positions of each storage resource in the selected subset of storage resources. According to one implementation, the data manager further defines an extended file attribute associated with the location metadata.

19 Claims, 7 Drawing Sheets

(51) Int. Cl.
*G06F 12/10* (2016.01)
*G06F 1/28* (2006.01)
*G06F 1/32* (2006.01)
*G06F 3/06* (2006.01)
*G06F 11/20* (2006.01)

(52) U.S. Cl.
CPC .... *G06F 11/2094* (2013.01); *G06F 2201/805* (2013.01); *Y02B 60/1246* (2013.01)

(56) References Cited

U.S. PATENT DOCUMENTS

| | | |
|---|---|---|
| 6,332,139 B1 | 12/2001 | Kaneko et al. |
| 6,560,155 B1 | 5/2003 | Hush |
| 6,766,420 B2 | 7/2004 | Rawson, III |
| 6,959,399 B2 | 10/2005 | King et al. |
| 6,986,075 B2 | 1/2006 | Ackaret et al. |
| 7,124,272 B1 | 10/2006 | Kennedy et al. |
| 7,210,005 B2 | 4/2007 | Guha et al. |
| 7,237,129 B2 | 6/2007 | Fung |
| 7,318,164 B2 | 1/2008 | Rawson, III |
| 7,334,140 B2 | 2/2008 | Jones et al. |
| 7,434,090 B2 | 10/2008 | Hartung et al. |
| 7,443,759 B1 | 10/2008 | Rowlands et al. |
| 7,516,348 B1 | 4/2009 | Ofer |
| 7,568,122 B2 | 7/2009 | Mechalke et al. |
| 7,661,005 B2 | 2/2010 | Spengler et al. |
| 7,673,167 B2 | 3/2010 | Elliott et al. |
| 7,699,023 B2 | 4/2010 | Chen et al. |
| 7,702,853 B2 | 4/2010 | Hetzler et al. |
| 7,859,834 B2 | 12/2010 | Fukuda et al. |
| 8,024,602 B2 | 9/2011 | DeCenzo et al. |
| 8,161,303 B2 | 4/2012 | Hakamata |
| 8,161,317 B2 | 4/2012 | Ishii et al. |
| 8,286,015 B2 | 10/2012 | Olarig et al. |
| 8,412,986 B2 | 4/2013 | Ishii et al. |
| 8,473,779 B2 | 6/2013 | Siewert et al. |
| 8,495,276 B2 | 7/2013 | Han et al. |
| 8,555,027 B2 | 10/2013 | Kimura et al. |
| 8,583,838 B1 | 11/2013 | Marshak et al. |
| 8,947,816 B1 | 2/2015 | Ryan et al. |
| 9,235,486 B1 | 1/2016 | Casaburi |
| 2005/0228943 A1 | 10/2005 | DeCenzo et al. |
| 2006/0004868 A1 | 1/2006 | Claudatos et al. |
| 2006/0062383 A1 | 3/2006 | Kaneda et al. |
| 2006/0206730 A1 | 9/2006 | Cartes et al. |
| 2007/0016811 A1 | 1/2007 | Suzuki et al. |
| 2007/0220316 A1 | 9/2007 | Guha |
| 2008/0276043 A1 | 11/2008 | Hetzler et al. |
| 2009/0083558 A1 | 3/2009 | Sugiki et al. |
| 2009/0089504 A1 | 4/2009 | Soran et al. |
| 2009/0119530 A1 | 5/2009 | Fisk et al. |
| 2009/0147393 A1 | 6/2009 | Hakamata |
| 2009/0150593 A1 | 6/2009 | Hamilton et al. |
| 2009/0198928 A1 | 8/2009 | Kommu |
| 2009/0249003 A1 | 10/2009 | Bates et al. |
| 2010/0011229 A1 | 1/2010 | Davis et al. |
| 2010/0138677 A1 | 6/2010 | Pagan et al. |
| 2011/0029787 A1 | 2/2011 | Day et al. |
| 2011/0083039 A1 | 4/2011 | Kim et al. |
| 2011/0239013 A1 | 9/2011 | Muller |
| 2011/0302224 A1* | 12/2011 | Yairi .................... G06F 3/0605 707/824 |
| 2012/0210169 A1 | 8/2012 | Coile et al. |
| 2012/0233484 A1 | 9/2012 | Rossi |
| 2012/0272038 A1 | 10/2012 | Wei et al. |
| 2012/0297114 A1 | 11/2012 | Koizumi et al. |
| 2013/0304963 A1 | 11/2013 | Luo et al. |
| 2013/0346793 A1 | 12/2013 | Flynn et al. |
| 2014/0003180 A1 | 1/2014 | Matsuda |
| 2014/0047261 A1 | 2/2014 | Patiejunas et al. |
| 2014/0281194 A1 | 9/2014 | Gaertner et al. |
| 2014/0297700 A1 | 10/2014 | Vongsouvanh et al. |
| 2015/0197330 A1 | 7/2015 | Mayer et al. |
| 2015/0362968 A1 | 12/2015 | Jurey et al. |
| 2015/0362972 A1 | 12/2015 | Frick |
| 2015/0362983 A1 | 12/2015 | Frick |
| 2015/0363109 A1 | 12/2015 | Frick |
| 2015/0363126 A1 | 12/2015 | Frick |
| 2015/0363288 A1 | 12/2015 | Frick |

OTHER PUBLICATIONS

Delaluz, et al., "Memory Energy Management Using Software and Hardware Directed Power Mode Control," Dept. of Computer Science & Engineering, Pennsylvania State University, Pennsylvania, 2001, 21 pages.

Deng, et al., "Architectures and Optimization Methods of Flash Memory Based Storage Systems," Journal of Systems Architecture 57, Department of Computer Science, Jinan University, China, 2011, 14 pages.

Dittia, et al, "The APIC Approach to High Performance Network Interface Design: Protected DMA and Other Techniques," Dept. of Computer Science, Washington University, St. Louis, MO, 1997, 24 pages.

Gibson, et al., "A Case for Network-Attached Secure Disks," School of Computer Science Carnegie Mellon University, Pittsburgh, PA, Sep. 1996, 19 pages.

Jin, et al., "High-speed Data Channel in the Disk Array System," Broadband European Networks and Multimedia Services 580, Sep. 1998, 2 pages.

Katz, Randy H., "High Performance Network and Channel-Based Storage," Computer Science Division, Dept. of EE and Computer Sciences, U.C. Berkeley, CA, Sep. 1991, 41 Pages.

Kottke, Thomas, "An Economical Data Acquisition System for Measuring and Recording Multiple Channels of Information at High Rates," Army Research Laboratory, National Technical Information Service, U.S. Dept. of Commerce, Springfield, VA, Sep. 1995, 79 pages.

Kumon, Kouichi, "Overview of Next-Generation Green Data Center," Fujitsu Sci. Tech, vol. 48, No. 2, Apr. 2012, 7 pages.

Riedel, Erik, "Active Disks—Remote Execution for Network-Attached Storage," Dissertation, School of Computer Science Carnegie Mellon University, Pittsburgh, PA, Nov. 1999, 203 pages.

Tudor, et al., "On Understanding the Energy Consumption of ARM-based Multicore Servers," Sigmetrics, Dept. of Computer Science, National University of Singapore, 2013, 12 pages.

Vekiarides, Nicos, "Fault-Tolerant Disk Storage and File Systems Using Reflective Memory," Dept. of Electrical & Computer Engineering, Carnegie Mellon University, Pittsburgh, Pennsylvania, 1995, 11 pages.

Yousif, Mazin, "Shared-storage Clusters," Cluster Computing Journal abstract, vol. 2, Issue 4, North Carolina, Dec. 1999, 6 pages.

Author Unknown, "Adaptive Memory Technology in Solid State Hybrid Drives," Seatage, retrieved on Apr. 1, 2015, 3 pages, retrieved from http://www.seagate.com/tech-insights/adaptive-memory-in-sshd-master-ti/.

Author Unknown, "DX100," Quamtum, retrieved on May 13, 2015, 1 page, retrieved from:http://www.quantum.com/serviceandsupport/softwareanddocumentationdownloads/dx100/index.aspx.

* cited by examiner

EXTENDED FILE ATTRIBUTES FOR REDUNDANT DATA STORAGE

CROSS-REFERENCE TO RELATED APPLICATIONS

The present application claims benefit of priority to U.S. Provisional Patent Application No. 62/012,205 entitled "Off-line/On-line Mass Data Storage Management" and filed on Jun. 13, 2014, and also claims benefit of priority to U.S. Provisional Patent Application No. 62/012,219 entitled "Off-line/On-line Mass Data Storage System" and filed on Jun. 13, 2014. Both of these applications are specifically incorporated by reference for all that they disclose or teach.

SUMMARY

Implementations disclosed herein provide data management techniques for creating and tracking data redundancies in a mass data storage system. According to one implementation, a data storage system includes a data manager that selects a subset of storage resources in the data storage system for redundant storage of a data file and generates location metadata for the data file defining physical and logical positions of each storage resource in the subset of storage resources.

According to another implementation, a computer-readable process comprises selecting a subset of storage resources in a mass data storage system for redundant storage of a data file; generating at least one extended file attribute associated with the location metadata; and saving at least a portion of the data file on each storage resource of the subset of select hardware storage resources.

According to yet another implementation, a computer-readable process comprises selecting a subset of storage resources in a mass data storage system for storage of a data file; generating and saving location metadata describing positions of each storage resource of the subset of storage resources; and generating an extended file attribute for the data file that acts as a pointer to the saved location metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

In a mass data storage system, data redundancies may be included on multiple different storage resources to increase a likelihood of data recovery in the event that one or more individual storage resources or system components fail. However, it can be difficult to predict and manage failures of multiple resources at one time. For example, failure of a power supply or field replaceable unit (FRU), such as a zone board including multiple drives, may temporarily render multiple resources unusable for read and write operations. In some cases, replacing an individual failed storage resource entails temporarily disconnecting and/or replacing a number of resources at once. These and other considerations pose significant challenges in providing guaranteed levels of data protection in mass data storage systems.

The implementations disclosed herein provide techniques for mass data storage that increase a likelihood of successful data reconstruction responsive to a diverse variety of potential contingency circumstances, such as single and multi-point drive and power failures. In one implementation, data redundancies are intentionally spread to different storage resources of a power grid to guarantee a baseline level of data protection in the event of power failure and/or replacement of a FRU.

Figure 1:
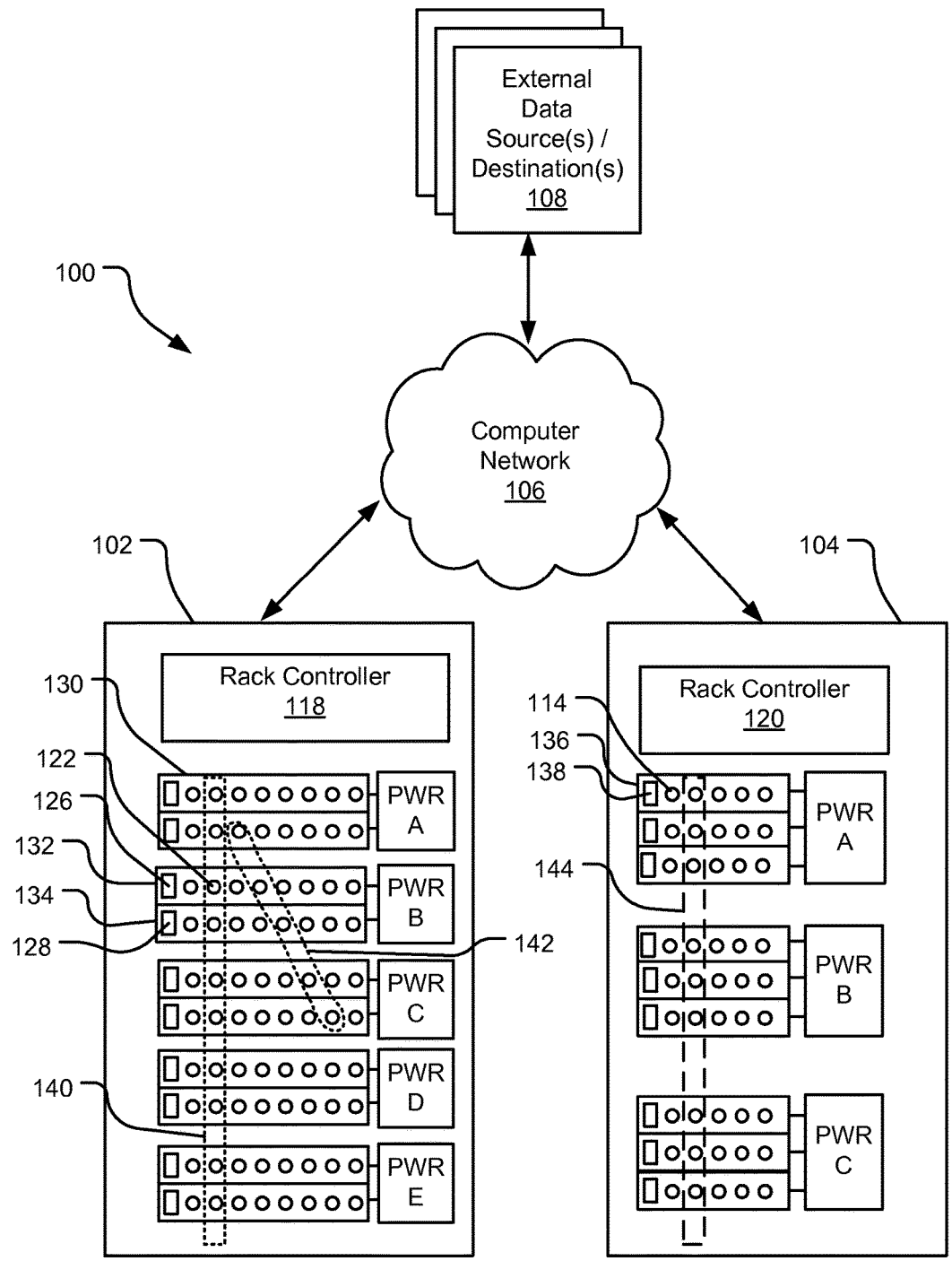
FIG. 1 illustrates an example mass data storage system that provides data redundancies for reconstruction of both individual storage resources and field replaceable units (FRUs).

FIG. 1 illustrates an example mass data storage system 100 that provides data redundancies for reconstruction of both individual storage resources and FRUs. The storage system 100 (e.g., a server cluster or farm) is comprised of a number of storage racks (e.g., storage racks 102, 104) oriented in adjacent or separate physical locations or facilities (e.g., data rooms or centers). The storage system 100 may accommodate any number of storage racks and each rack is located in one of any number of server facilities. The storage system 100 may accommodate any use of mass data storage (e.g., content delivery, backup, archiving, running scientific simulations such as computational fluid dynamics, and rendering computer generated imagery, such as a render farm).

The individual storage racks are interconnected to one another via a computer network 106 (e.g., Ethernet or a custom interconnect network) and may also be connected to one or more external data source(s)/destination(s) 108 via the same computer network 106 or an additional interconnected network (e.g., a local area network or a wide area network, not shown) using a variety of communication protocols including but not limited to (e.g., transmission control protocol/internet protocol ("TCP/IP"), packet over synchronous optical networking/synchronous digital hierarchy ("SONET/SDH"), multiprotocol label switching ("MPLS"), asynchronous transfer mode ("ATM"), Ethernet, Infiniband, and frame relay). As a result, data may be moved between the individual storage racks and the external data source(s)/destination(s) 108 as desired.

Each individual storage rack includes an array of storage media units, also referred to herein as zone boards, (e.g., media units 130, 132, 134, 136). In FIG. 1, the media unit represents an example Field Replaceable Unit (FRU). As used herein, "FRU" generally refers to the smallest component or assembly that can be quickly or easily removed to replace or repair one or more storage resources. Each of the media units is mutually coupled to and controlled by a rack controller (e.g., example rack controllers 118 and 120). The storage rack 102 includes 10 media units controlled by the rack controller 118 and distributed across five power supply units (PWR A, PWR B, PWR C, PWR D, and PWR E) so that each power supply unit is shared by a pair of consecutive media units and a ratio of media units to power supply units is 2:1.

The storage rack 104 includes 9 individual storage media units controlled by a rack controller 120 and distributed across three power supply units (PWR A, PWR B, PWR C) such that a ratio of media units to power supply units is 3:1. In other implementations, some storage racks include greater or fewer individual media units than the depicted 10 and 9 storage media units per storage rack and/or a different distribution of media units powered by each power supply unit. In other implementations, some racks may not include a rack controller and/or an individual rack controller may control multiple racks.

Each of the media units or zone boards (e.g., a media unit 130) includes an array of individual storage drives (e.g., a storage drive 122) controlled by an associated media unit controller (e.g., a media unit controller 126). For example, the media units 132 and 134 each include 8 individual storage drives controlled by a corresponding media unit controller 126 and 128, respectively. The media unit 136 includes 5 individual storage drives (e.g., storage drive 114) controlled by media unit controller 138. In other implementations, individual storage media units may include greater or fewer storage drives than the depicted 8 and 5 storage drives per media unit. In at least one implementation, a media unit includes a single storage drive. In still other implementations, individual storage resources may not be grouped into media units (as shown) and controlled by a shared controller (e.g., the media unit controller 126). Rather, storage resources may be controlled by a single rack controller and/or may include separate, independent processors collectively coupled to one or more rack or chassis controllers.

It may be understood that in FIG. 1, the media unit (e.g., 130) represents an example FRU. In other implementations, the FRU may represent a finer level of granularity—such as an individual disk or drive.

In one implementation, each storage drive is a distinct storage medium or set of storage media with some or all of the read/write control functions of the storage drive removed to the corresponding media unit controller and/or rack controller of the mass data storage system 100. In another implementation, read/write control functions of one or more of the storage drives are retained within the storage drives and are thus not removed to the corresponding media unit controller or rack controller of the mass storage system.

In the mass data storage system 100, each of the individual storage resources may each be assigned to one or more logical zones (e.g., logical zones 140, 142, 144). The individual logical zones are each designed to provide an associated level of data protection to data stored therein. For example, data protection may be provided by a combination of redundancies stored in the logical zone and erasure code, CRC or LDPC applied within the logical zone.

To guarantee high levels of data protection, each logical zone is defined to include storage resources distributed across a power grid according to one or more resource distribution rules. As used herein, a "resource distribution rule" is a rule limiting a physical distribution of one or more storage resources, power supply units, and/or other system components relative to one another. One example resource distribution rule limits possible arrangements of storage resources relative to power supply units. For example, the logical zone 140 is defined to include a distribution of storage resources with no more than two storage resources that share a same power supply unit. In contrast the logical zone 144 is defined to include a distribution of storage resources with no more than three storage resources sharing a same power supply unit. Another example resource distribution rule limits a total number of storage resources in a same logical zone that can be in a same FRU. For example, the logical zone 142 includes no more than one storage resource per media unit.

Assignments of storage resources to the various logical zones may be based on any criteria, and may even be arbitrary provided that each assigned grouping of storage resources satisfies the resource distribution rules specified for the associated logical zone. The storage resources in each individual logical zone may be arranged according to a variety of different possible configurations and may include, for example, one or more vertically adjacent storage resources (e.g., as in the logical zones 140 and 144), diagonally adjacent storage resources (as in the logical zone 142), non-adjacent resources, and/or horizontally adjacent resources.

When data is written to a storage resource in the mass data storage system 100, data redundancies are stored in multiple storage resources in a same logical zone. "Data redundancies" refers to, for example, data that is in addition to user or system data that permits correction of errors in stored or transmitted data. For example, data redundancies may refer to data that is spread across and/or duplicated at a number of different storage locations that can be assembled in one or more ways to reconstruct a cohesive data set. By storing data redundancies in multiple storage locations of a logical zone (e.g., a logical zone 140), data can be physically spread to disparate locations on a power grid (e.g., different FRUs, different power supply units, etc.) so as to optimize data retrieval in the event of failure or one or more media units or power supply units. For example, a failure of the storage resource 122 may result in temporary ejection and/or replacement of the corresponding media unit 132. When the media unit 132 is placed back on-line after a replacement or repair, lost data of the storage resource 122 can be restored from redundant data on other storage resources in the logical zone 140, such as data located in different FRUs and powered by different power supply units.

As mentioned above, a media unit represents one example FRU. However, in other implementations, an FRU may be multiple media units or one or more multi-drive units including characteristics different from the media units described herein. The following description provides an exemplary framework for spreading data redundancies across a power grid to maximize a likelihood of data reconstruction in the event of storage resource failure, power failure, or FRU replacement.

Figure 2:
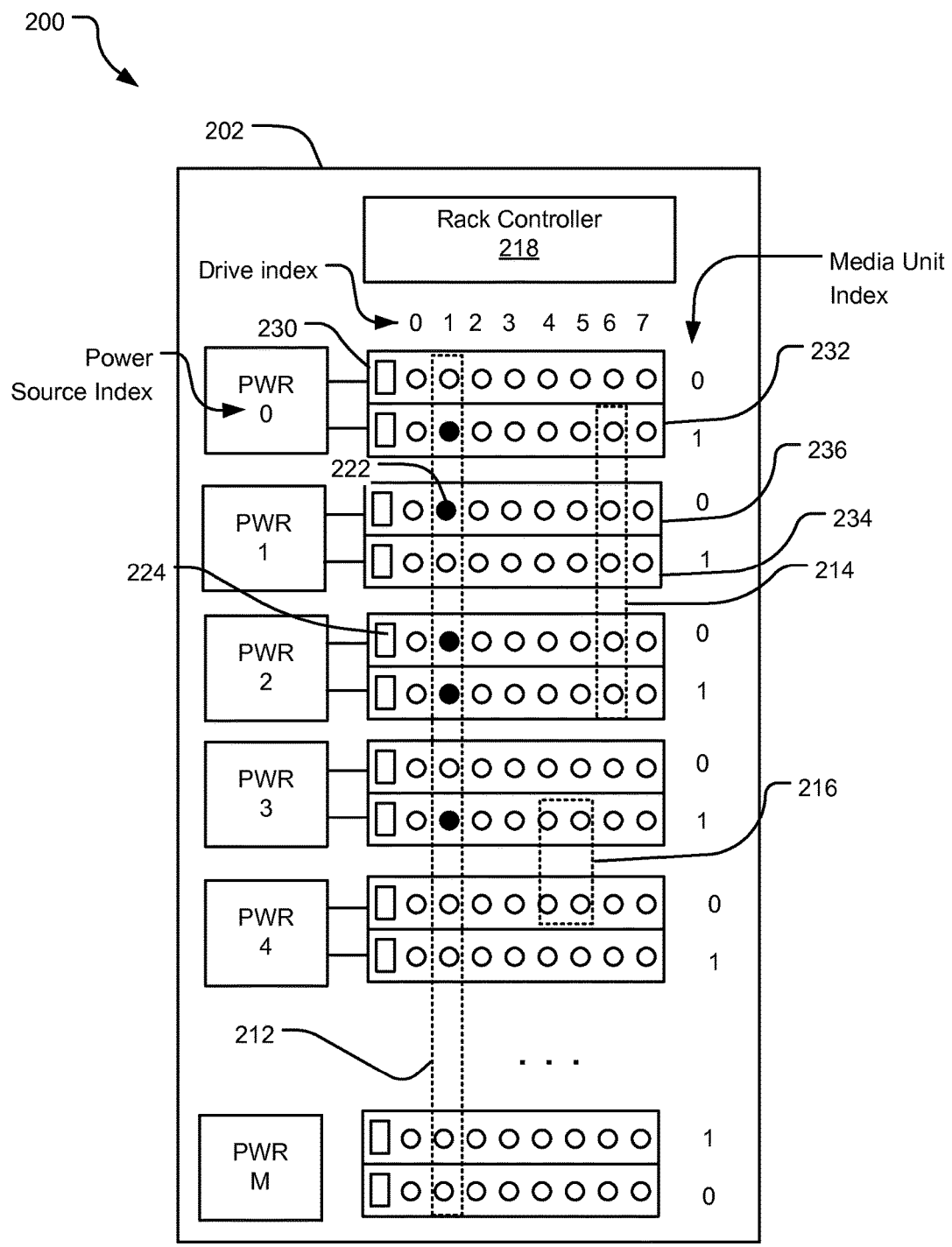
FIG. 2 illustrates an example data management scheme for providing data redundancies across FRUs in a mass data storage system.

FIG. 2 illustrates an example data management scheme for providing sufficient data redundancies across multiple FRUs in a mass data storage system 200. As used herein, the term "sufficient data redundancies" refers to data redundancies sufficient to fully reconstruct lost data assuming that a total amount of lost data is less than an anticipated worst case failure scenario. In one implementation, the mass data management system 200 provides sufficient data redundancies to reconstruct data on all storage resources powered by the same power supply unit. For example, two media units 236 and 234 powered by the same power supply unit (PWR 1) may be ejected, replaced, and restored without first making hard copies of any data stored on the associated storage drives (e.g., a storage drive 222). The data on all 16 storage drives included in the media units 234 and 236 can be fully restored from system redundancies.

The mass data storage system 200 includes a storage rack 202 including a number of media units (e.g., media units 230, 232) mutually coupled to and controlled by a rack controller 218 (e.g., a compute node). Each media unit (e.g., zone board) includes a media unit controller (e.g., a media unit controller 224) communicatively coupled to an associated nest of storage drives (e.g., via compute nodes, serial attached SCSI ("SAS") connections, etc.). Further the rack controller 218 is communicatively coupled to the media unit controllers within the corresponding rack 202.

When an individual storage drive fails, the corresponding FRU may be taken off-line to facilitate repair or replacement of components or the entire FRU. Where a storage drive is "off-line," data cannot be written to or read from the storage drive. For example, all storage drives in the media unit 236 may become unavailable for read and write operations if the storage drive 222 fails and the media unit 236 is taken off-line to facilitate repair or component replacement. In some implementations, the entire media unit 236 is replaced when a single drive within the media unit fails. In other implementations, individual drives within the media unit 236 can be independently replaced or repaired.

In the mass data storage system 200, the media units are each powered by a respective power supply unit (e.g., power sources denoted PWR 0-PWR M). A distribution of media units to power supply units varies in different implementations; however, in FIG. 2, a ratio of media units to power supply units is 2:1 so that each power supply unit is shared by a pair of physically adjacent media units. In other implementations, the ratio of media units to power supply units is any ratio supporting applicable data protection rules for an associated physical or logical area of the mass data storage system, such as, for example, 5:1, 10:1, etc.

A "physical position matrix" defines a physical orientation of storage resources and power resources in the mass storage system 200 relative to one another. For example, physical positions of the storage resources and power supply units can be defined by a physical position matrix of the form [PowerUnit$_{(i)}$, MediaUnit$_{(j)}$, Position$_{(k)}$], where 'i' is an index of the power supply unit (e.g., 0, 1, 2, . . . M); 'j' is an index of a media unit corresponding to each power supply unit (e.g., 0 or 1 in the implementation shown); and 'k' is a drive index position of each storage drive within a single associated media unit (e.g., positions 0-7 in each media unit including 8 storage drives). Using this notation, each storage drive in the mass storage system occupies a unique index corresponding to a specific power supply unit. For example, the storage drive 222 is described by the position [1, 0, 1] (e.g., power supply unit=PWR 1, media unit=0, and drive index=1).

The above-described notation is just one of many suitable formats for describing a physical layout of storage drives and power resources within a mass storage system. In another implementation, physical positions of the storage resources are described by a matrix of the form media unit [Rack position$_{(i)}$, SlotPosition$_{(j)}$] where 'i' is physical position of a media unit in a rack and 'j' denotes a drive array position of each storage drive within a single associated media unit. A variety of other formats are also contemplated. In some implementations, a physical position matrix is used to described power and storage resources distributed across a portion of a rack rather than an entire rack.

Each unique index of the physical position matrix can be further associated with a sub-matrix defining a "logical zone." For example, logical zones 212, 214, and 216 are each defined by sub-matrices indicated by dotted lines. The logical zones 212, 214, and 216 each include storage resources distributed in a manner that satisfies one or more resource distribution rules applied to the respective logical zone. In one implementation, all logical zones apply the same resource distribution rules. In another implementation, different logical zones apply different resource distribution rules.

According to one implementation, one or more of the logical zones apply a resource distribution rule specifying maximum number of storage resources in each zone that may be powered by a same power supply unit. For example, each of the logical zones 212, 214, and 216 group together storage resources distributed such that no singular power supply unit (e.g., PWR 0-PWR M) supplies power to more than two storage resources in a same logical zone.

In another implementation, one or more logical zones apply a resource distribution rule specifying a maximum number of storage resources per logical zone that can belong to a same FRU. For example, the logical zone 216 imposes a resource distribution rule allowing up to two storage drives of a same FRU to be in the same logical zone, while the logical zone 212 imposes a resource distribution rule mandating that each storage drive of a same FRU is in a different logical zone.

For simplicity, each of the logical zones 212, 214, and 216 is shown to include storage resources arranged in vertical columns. Provided that each logical zone satisfies any applicable resource distribution rules, the storage resources in each logical zone can be arranged in a number of different possible configurations (e.g., diagonally adjacent storage resources, horizontally-adjacent storage resources, non-adjacent storage resources, etc.). Logical zones may span more than one rack (e.g., the rack 202) and may include storage resources in more than one facility.

Some storage drives in the storage system 200 may not be initially assigned to a logical zone. Instead, these storage drives can be used as "spares" that can be elastically added to and/or removed from one or more of the existing logical zones. Other storage resources may be assigned to more than one logical zone. In some implementations, the rack controller 218 or other compute node may "re-zone" the logical resources dynamically to allow for redistribution of the storage resources to different logical zones.

When incoming data is written to a particular logical zone in the storage system 200, redundancies of the data are written to multiple storage locations within the same logical zone. For example, data directed to a storage drive 222 is redundantly written (e.g., creating data redundancies, as defined above) to storage drives within the logical zone 212, such as different FRUs powered by different power supply units. In the illustrated example, data directed to the storage drive 222 is redundantly written to storage drives defined by the physical matrix positions [0, 1, 1], [2, 0, 1], [2, 1, 1], and [3, 1, 1], as indicated by the solid-filed dots within the logical zone 212.

When data of a write command arrives at the rack controller 218, the rack controller 218 first determines a target logical zone for the data. For example, the data may be addressed to a particular logical zone or the rack controller 218 may assign the data to a logical zone based on a variety of considerations such as a level of data protection specified by a user (e.g., a user's subscription plan to the mass storage system 200), a type of data, availability of various resources, etc.

Based on the determined target logical zone, the rack controller 218 further determines a number of storage resources in the target logical zone to receive the data (e.g., redundant data) of the write command. In one implementation, each logical zone is associated with a degree of data protection provided to resources located therein. For example, the logical zone 212 may apply redundancies providing a first degree of data protection to data stored therein while the logical zone 214 may apply redundancies providing a second different degree of data protection to data stored therein. Thus, the target logical zone may dictate the number of resources on which data redundancies are included.

After determining the number of storage resources to receive the data redundancies, the rack controller 218 selects specific storage resources within the target logical zone to receive the data. Selection of storage resources may be based on a variety of factors including some not discussed above, such as available storage capacity of each resource, power constraints restricting usage of certain resources, etc.

After selecting storage resources to receive data of a write operation, the rack controller 218 writes data redundancies of the incoming data to the selected storage resources within the target logical zone.

In addition to writing the data redundancies, the rack controller 218 (or other compute node within the mass storage system 200) creates metadata associated with the data and also creates an extended file attribute associated with the created metadata. In traditional file systems, 'regular' file attributes have a strictly defined purpose (e.g., identifying filename, permissions, records of creation, modification times, etc.). In contrast with a regular file attribute, extended file attributes are file system features that enable users to associate computer files with metadata not interpreted by the file system. In one implementation of the disclosed technology, extended file attributes are managed by a file system interface of the mass data storage system 200 that interfaces with user devices external to the system.

In one implementation, the rack controller 218 generates one or more extended file attributes that specify positions of the data redundancies (hereinafter, "location metadata"). In another implementation, the location metadata is not stored as one more extended file attributes. Rather, the location metadata is saved separately from the extended file attributes and the rack controller 218 generates an extended file attribute that points to the storage location(s) of the associated location metadata.

The location metadata includes variety of position-identifying attributes for each associated data redundancy. Example position-identifying attributes included in the location metadata include without limitation: (1) a world wide unique identifier defining a media unit storing the data redundancy; (2) physical position of the defined media unit in an associated rack and/or other type of physical position of the media unit; (4) a logical index referring to an individual drive; (5) a physical position of a drive index within the media unit storing the redundancy; (6) a logical block address where the redundancy is stored; and (7) and a length of transfer for the redundancy.

In general, the location metadata generated by the rack controller 218 includes both logical location components and physical location components. The logical location component(s) are used when reading or writing data to the storage resource. For example, the "world wide unique identifier" is a logical component that refers to a unique media unit identifier. The world wide unique identifier for a media unit remains constant regardless of where a particular media unit is moved within an associated rack. In contrast, a physical location component of location metadata may include, for example, indices of the physical position matrix indicating where the data redundancies are physically stored (e.g., in relation to one another, various FRUs, and various power supply units of the mass data storage system).

In various implementations, the location metadata can be stored in different locations, such as with the data redundancies and/or in one or more other storage locations accessible by one or more media unit controller(s) or rack controller(s).

In the example write of FIG. 2, the rack controller 218 spreads incoming data to redundant storage locations within the logical zone 212 indicated by the solid-filled dots. As used herein, the term "redundant storage locations" refers to locations storing corresponding data redundancies. In addition, the rack controller 218 or other compute node creates metadata indicating the logical and physical positions where the data redundancies are stored. For example, the metadata indicates that the data redundancies are stored at the following positions of the physical position matrix: [0, 1, 1], [1, 0, 1], [2, 0, 1], [2, 1, 1], and [3, 1, 1]. In the event that a storage drive fails at any of these positions, the storage system 200 can rebuild lost data on the failed drive using the redundant data stored within the same logical zone.

If, for example, a storage drive 222 at position [1, 0, 1] fails, the associated FRU (e.g., media unit 236) may be taken offline to facilitate replacement of the storage drive 222. When the FRU is returned to an on-line state (e.g., a state where data may be read from and written to the FRU), the new storage drive at position [1, 0, 1] can be restored to a pre-failure state using the other data redundancies by the positions [0, 1, 1], [2, 0, 1], [2, 1, 1], and [3, 1, 1].

The above-described data distribution scheme guarantees a data distribution across multiple FRUs. Therefore, if data of the storage drive 222 is updated while the media unit 236 is off-line, the updated data is not lost. Rather, the update is written into the redundancies of other FRUs on the system within the same logical zone. These other FRUs can then be subsequently used to restore the storage drive 222 once the media unit 236 is back online.

Figure 3:
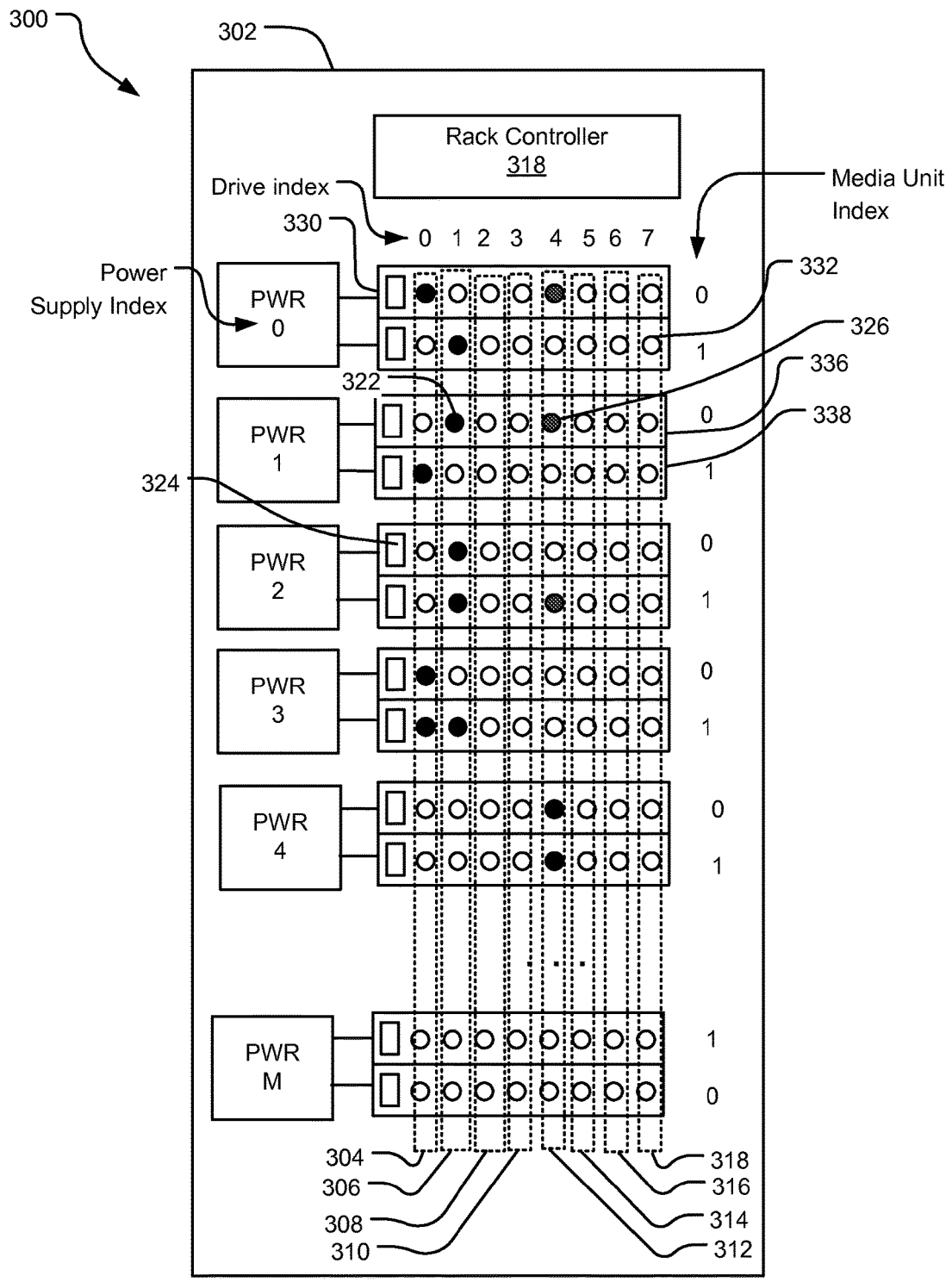
FIG. 3 illustrates another example data storage scheme for providing data redundancies across FRUs in a mass data storage system.

FIG. 3 illustrates another example data storage scheme for providing data redundancies across multiple FRUs in a mass data storage system 300. The mass data storage system 300 includes a storage rack 302 including a number of media units (e.g., media units 330 and 332) mutually coupled to and controlled by a rack controller 318 (e.g., a compute node). Each media unit includes a media unit controller (e.g., a media unit controller 324) communicatively coupled to an associated nest of storage drives. The rack controller 318 is communicatively coupled to the media unit controllers within the corresponding rack 302.

Each storage drive in the mass data storage system 300 has a physical position defined by an index in a physical position matrix relating physical locations of various storage resources, power resources, and FRUs. For example, physical positions of the storage resources and power supply units can be defined by a physical position matrix of the form [PowerUnit$_{(i)}$, MediaUnit$_{(j)}$, Position$_{(k)}$], where 'i' is an index of the power supply unit (e.g., 0, 1, 2, . . . M); 'j' is an index of a media unit (FRU) corresponding to each power supply unit (e.g., 0 or 1 in the implementation shown); and 'k' is a drive array position of each storage drive within a single associated media unit (e.g., positions 0-7 in each media unit including 8 storage drives).

Each position within the physical position matrix may be further associated with one or more logical zones. Each logical zone groups together resources having a distribution satisfying one or more pre-defined resource distribution rules. In one implementation, a power-resource distribution rule specifies a maximum number of storage resources in each zone that may be powered by a same power supply unit. For example, FIG. 3 illustrates example logical zones 304, 306, 308, 310, 312, 314, 316, 318. None of these logical zones include more than two storage resources powered by a same power supply unit.

When data is written to the mass data storage system 300, the data is assigned to a logical zone and written to multiple locations (either in full or part) within the assigned logical zone. For example, the logical zone 304 stores data redundancies in positions of the physical position matrix defined by [0, 0, 0], [1, 1, 0], [3, 0, 0], and [3, 1, 0]; the logical zone 306 stores redundant data in positions of the physical position matrix defined by [0, 1, 1], [1, 0, 1], [2, 0, 1], [2, 1, 1],and [3,1,1]; and the logical zone 312 stores data redundancies in positions of the physical position matrix defined by [0, 0, 4], [1, 0, 4], [2, 1, 4], [4, 0, 4], and [4, 1, 4].

If one or more drives in a particular media unit (e.g., media unit 336) fail, the entire media unit may be replaced and restored. Restoration can be performed in a number of different ways depending on variable circumstances of a given failure scenario.

In one implementation, a storage drive replacement is anticipated and data of the drive is physically copied to a "spare" prior to replacing the storage drive. If, for example, the storage drive 322 fails, data of the storage drive 326 may be copied to a spare drive in anticipation of the replacement of the media unit 336, provided that the storage drive 326 is functional and such copy can be made. When the media unit 336 comes back on-line after the replacement, the storage drive 326 can be restored (in full or part) from the spare.

In another implementation, one or more storage drives are restored entirely from redundancies included in a same logical zone. If, for example, the media unit 336 is replaced, each of the 8 storage drives within the media unit 336 can be restored from redundant data stored in the corresponding logical zone (e.g., of the 8 different logical zones 304, 306, 308, 310, 312, 314, 316, and 318). For example, data of the storage drive 322 may be restored from data redundancies in the logical zone 306 on storage drives identified by the positions [0, 1, 1], [2, 0, 1],[2, 1, 1], and [3, 1, 1]. Likewise, data of the storage drive 326 can be restored from data redundancies in the logical zone 312 identified by the positions [0, 0, 4], [2, 1, 4], [4, 0, 4], and [4, 1, 4]. In this manner, data of an entire FRU (e.g., the media unit 336) can be restored from data redundancies distributed across other FRUs in the mass data storage system 300.

In the event of a power supply unit failure, multiple FRUs may go off-line. For example, FRUs 336 and 338 may both go off-line if the power supply unit "PWR 1" fails. While the power supply unit PWR 1 is being repaired and/or replaced, the rack controller 318 may continue to receive write commands to update or modify data stored in the media units 336 and 338. In this scenario, the rack controller 318 may continue writing data redundancies to available storage resources while the media units 336 and 338 are off-line. When power to the failed power supply unit ("PWR 1") is restored, data of each storage drive in the media units 336 and 338 can be compared to and reconciled with corresponding data redundancies in the redundant storage locations of the corresponding logical zone. For example, data on the storage drive 332 may be compared to and reconciled with data stored on storage drives at the positions [0, 0, 0], [2, 0, 1], [2, 1, 1], and [3, 1, 1].

Figure 4:
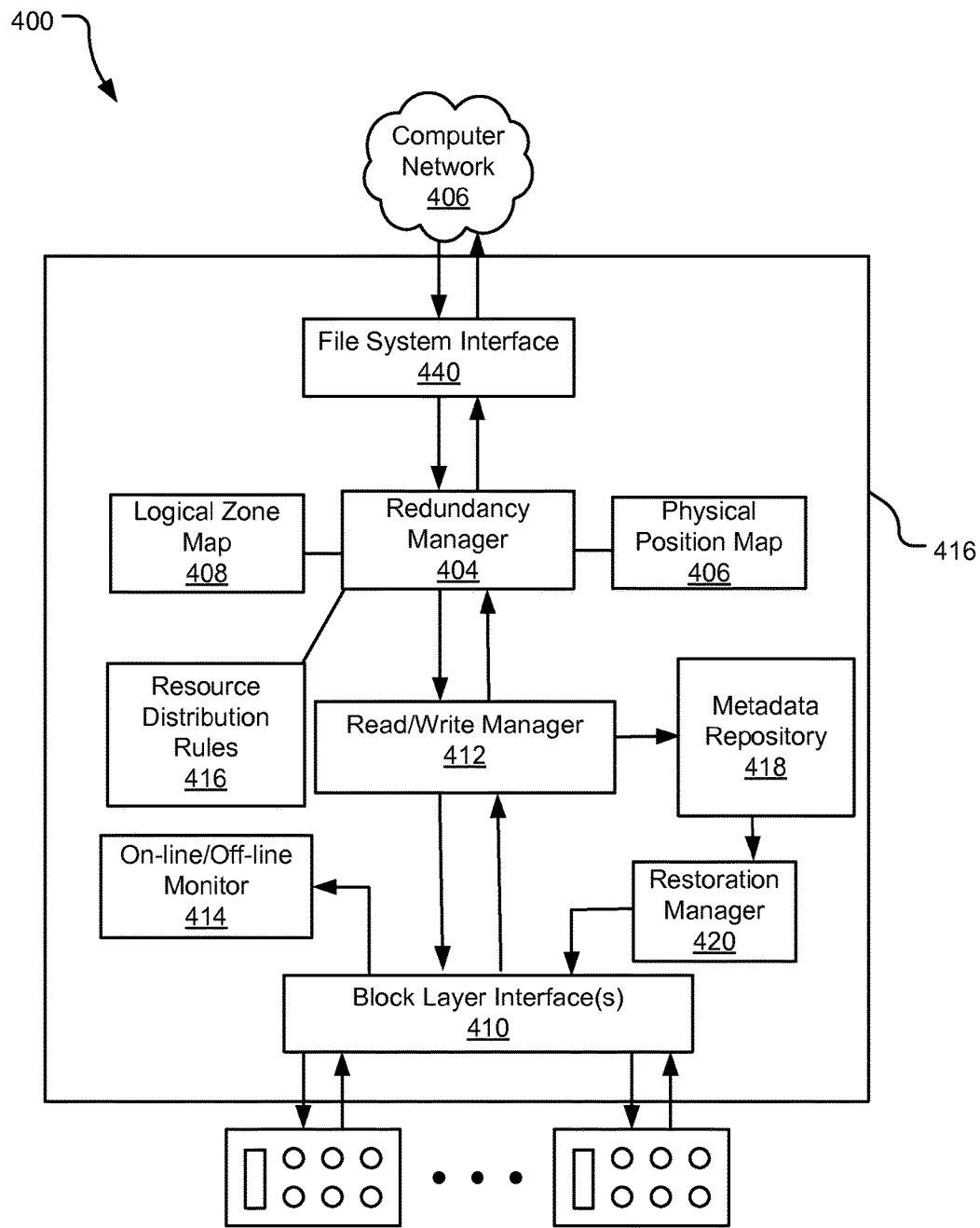
FIG. 4 illustrates an example control system that provides data redundancies for data reconstruction in a mass data storage system.

FIG. 4 illustrates an example control system 416 that provides data redundancies for reconstruction of a data file in a mass data storage system 400. Aspects of the mass data storage system 400 may be contained within a rack controller (e.g., rack controller 118 of FIG. 1) and/or a media unit controller (e.g., media unit controller 126 of FIG. 1) associated with each individual storage drive of the mass data storage system 400. In some implementations, aspects of the storage system 400 may span multiple racks and/or geographic locations.

The control system 416 includes a file system interface 440 that allows the mass data storage system 400 to receive incoming data files from external data source(s) from a computer network 406 and send outgoing data files to external data destination(s) that may have disparate operating systems operating over one or more computer networks. The file system interface 440 indexes and manages file system information that allows the system to locate and read file attributes responsive to receipt of a user read command. For example, the file interface 440 saves file attributes and extended file attributes in an index that further associates a user file identifier with such attributes. Extended file attributes may be created responsive to feedback from the redundancy manager 404 (as discussed in further detail below).

The file system interface 440 is communicatively coupled to redundancy manager 404 that manages a physical position map 406 and a logical zone map 408. The physical position map 406 maps physical positions of various storage resources, FRUs, and power supply units in relation to one another. The logical zone map 408 maps groupings of storage resources into various logical zones according to one or more resource distribution rules. For example, one logical zone may apply a resource distribution rule under which an individual power supply unit can power no more than a maximum predetermined number of storage resources in one zone. Another example resource distribution rule specifies that a maximum number of storage resources per logical zone that can belong to a same FRU. A variety of other resource distribution rules are contemplated for use in other implementations. The logical zone map 408 may designate some individual storage resources as "spares" that are not associated with any particular logical zone; other individual storage resources may be assigned to more than one logical zone.

The redundancy manager 404 is communicatively coupled to a read/write manager 412 and the read/write manager 412 is coupled, through a block layer interface 410, to a plurality of storage nodes (e.g., rack controllers, media unit controllers, etc.) within the mass storage system 400. Communication channels may allow for bidirectional data flow between all storage nodes in the mass data storage system 400. For example, the read/write manager 412 may be communicatively coupled to a plurality of different rack controllers; each rack controller may be communicatively coupled to media unit controllers within the corresponding rack; and each of the media unit controllers may be communicatively coupled to an associated nest of internal storage drives.

When the redundancy manager 404 receives a command to write new data to the mass data storage system 400 (e.g., from the computer network 408), the redundancy manager 404 consults the logical zone map 408 to select a logical zone on which to store the incoming data. The redundancy manager 404 may further consult resource distribution rules 416 to determine which storage resources within the selected logical zone to write the data to. The resource distribution rules 416 may specify, for example, a level of data protection associated with each logical zone, one or more rules for distributing data redundancies across different FRUs in a logical zone, one or more rules for distributing data redundancies across storage resources in a logical zone powered by disparate power supply units, etc.

Based on the resource distribution rules, the redundancy manager 404 selects specific storage resources to receive data redundancies for each data file. Further, the redundancy manager 404 generates location metadata identifying each of the selected storage locations. In one implementation, the redundancy manager 404 generates one or more extended file attributes for each data file that include location metadata. The extended file attribute(s) are provided to and further managed by the file system interface 440.

In another implementation, the redundancy manager 404 saves the location metadata in a metadata repository 418 and generates an extended file attribute for the file that points to the location of the associated location metadata in the metadata repository 418. The extended file attribute is provided to and further managed by the file system interface 440. The read/write manager 412 writes the data to the selected individual storage resources along with the extended file attribute pointing to the associated location metadata. In one implementation, the metadata includes a physical location component and a logical location component. The physical component indicates positions in the physical position map where the data (or a portion of the data) is stored. The logical component indicates logical positions where the data is stored (e.g., a unit ID or logical address of each storage resource).

An off-line/on-line monitor 414 monitors a power state of various storage resources in the mass data storage system 400. When a storage resource goes off-line unexpectedly, the on-line/off-line monitor 414 flags the storage resource as potentially 'down for repair/replacement.' In some implementations, a storage resource is flagged as 'down for repair/replacement' by other mechanisms (e.g., subsystems) of the control system (not shown). For example, a user may hit an "ejection button" that transmits a command to the off-line/on-line monitor 414 to flag a particular FRU as 'down for repair/replacement.'

The off-line/on-line monitor 414 communicates with a restoration manager 420, and informs the restoration manager 420 when a new (e.g., a replacement) storage resource is first detected on-line. Responsive to communications from the off-line/on-line monitor 414, the restoration manager 420 accesses metadata corresponding to the physical positions of the replaced resource(s) and, from the metadata, determines a location of data redundancies that may be used to restore data of the replaced storage resource(s). The restoration manager 420 then accesses the data redundancies and restores data in the replaced storage resources to reflect a current state of the data redundancies.

In some implementations, restoration of data entails comparison with and reconciliation to data redundancies stored in one or more redundant data locations. For example, a power supply unit failure may temporarily cause one or more storage resources to go off-line. While the storage resources are off-line, data directed to those storage resources may be updated and the updates performed to the data at the redundant data locations. When the off-line resources are returned to an on-line state, the stored data of those resources is no longer current and the restoration manager uses the associated data redundancies to restore the data to a current state of the data redundancies.

In FIG. 4, one or more of the redundancy manager 404, read/write manager 412, on-line/off-line monitor 414, and restoration manager 420, are embodied in software and/or hardware implemented in a tangible computer-readable storage media readable by a computing node within or communicatively coupled to the mass data storage system. The term "tangible computer-readable storage media" includes, but is not limited to, random access memory ("RAM"), ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism.

Figure 5:
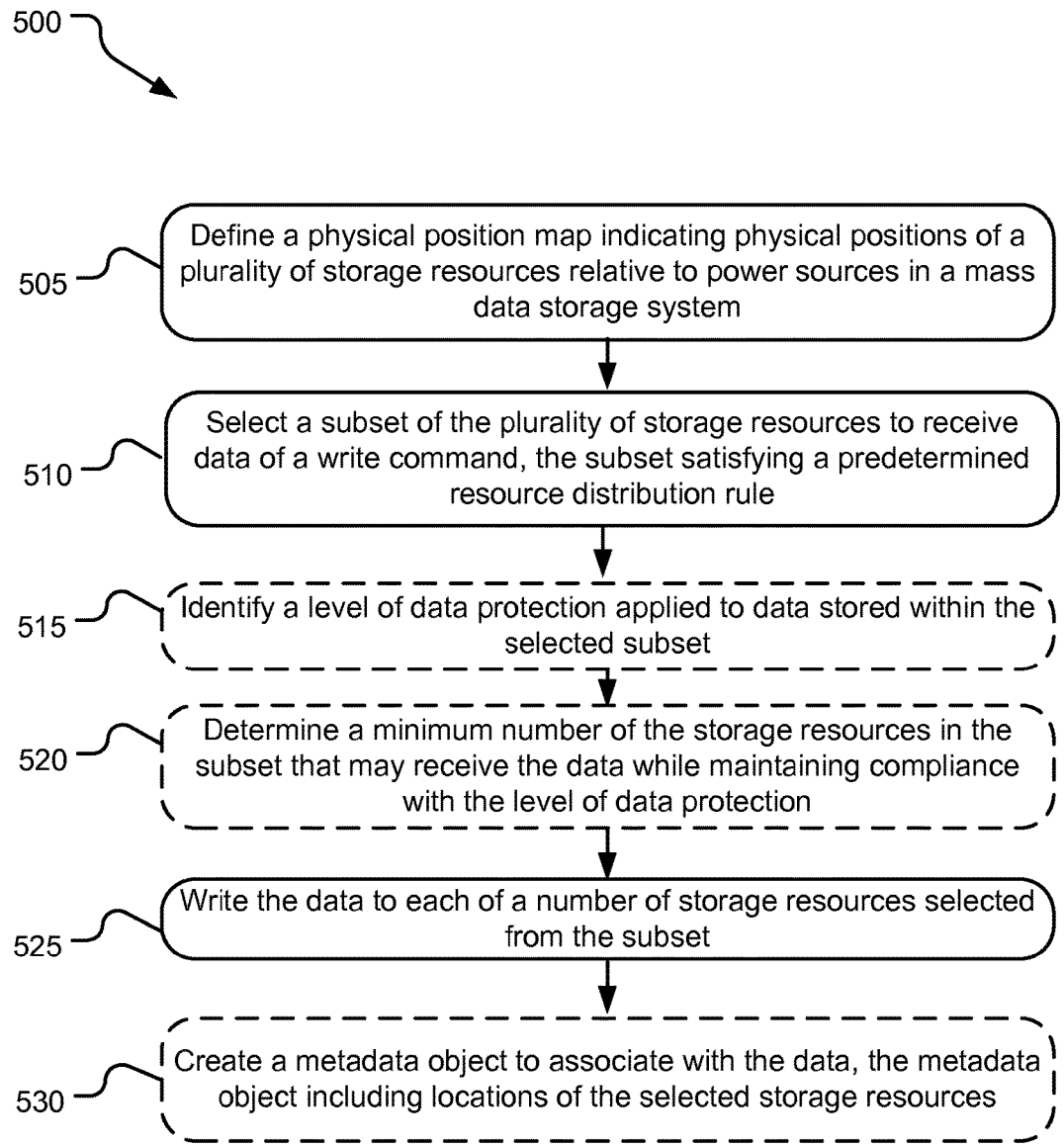
FIG. 5 illustrates example operations for providing redundancies for data reconstruction in a mass data storage system.

FIG. 5 illustrates example operations 500 for providing redundancies for reconstruction of FRUs in a mass data storage system. A first defining operation 505 defines a physical position map (e.g., a matrix) indicating physical positions of a plurality of storage resources relative to power supply units in the mass data storage system. In some implementations, the physical position map also indicates physical positions of the plurality of storage resources relative to one another and/or to different field replaceable units in the mass data storage system.

A selection operation 510 selects a subset of the plurality of storage resources to receive data of a write command. In one implementation, the subset is a logical zone providing a guaranteed level of data protection to data stored therein. The selected subset includes storage resources physically distributed about the system in a manner that satisfies a predetermined physical distribution rule. One example predetermined resource distribution rule limits a number of storage resources that can be in a same logical zone and included in a same FRU. Another example predetermined resource distribution rule limits a number of storage resources that can be in a same logical zone and powered by a same power supply unit.

An identification operation 515 identifies a level of data protection applied to data stored within the selected logical zone and a determination operation 520 determines a minimum number of storage resources that may receive the data (e.g., data redundancies) while maintaining compliance with the identified level of data protection.

A write operation 525 writes the data (e.g., data redundancies) to one or more selected storage resources of the subset, thereby providing the identified level of data protection. In one implementation, the selected storage resources of the subset are selected based on the determination operation 520 and/or one or more other considerations such as resource availability, power constraints, desired storage attributes, etc. A metadata creation operation 530 creates a metadata object indicating the physical and logical locations of the data redundancies. The metadata object is associated in memory with each of the selected storage resources.

Figure 6:
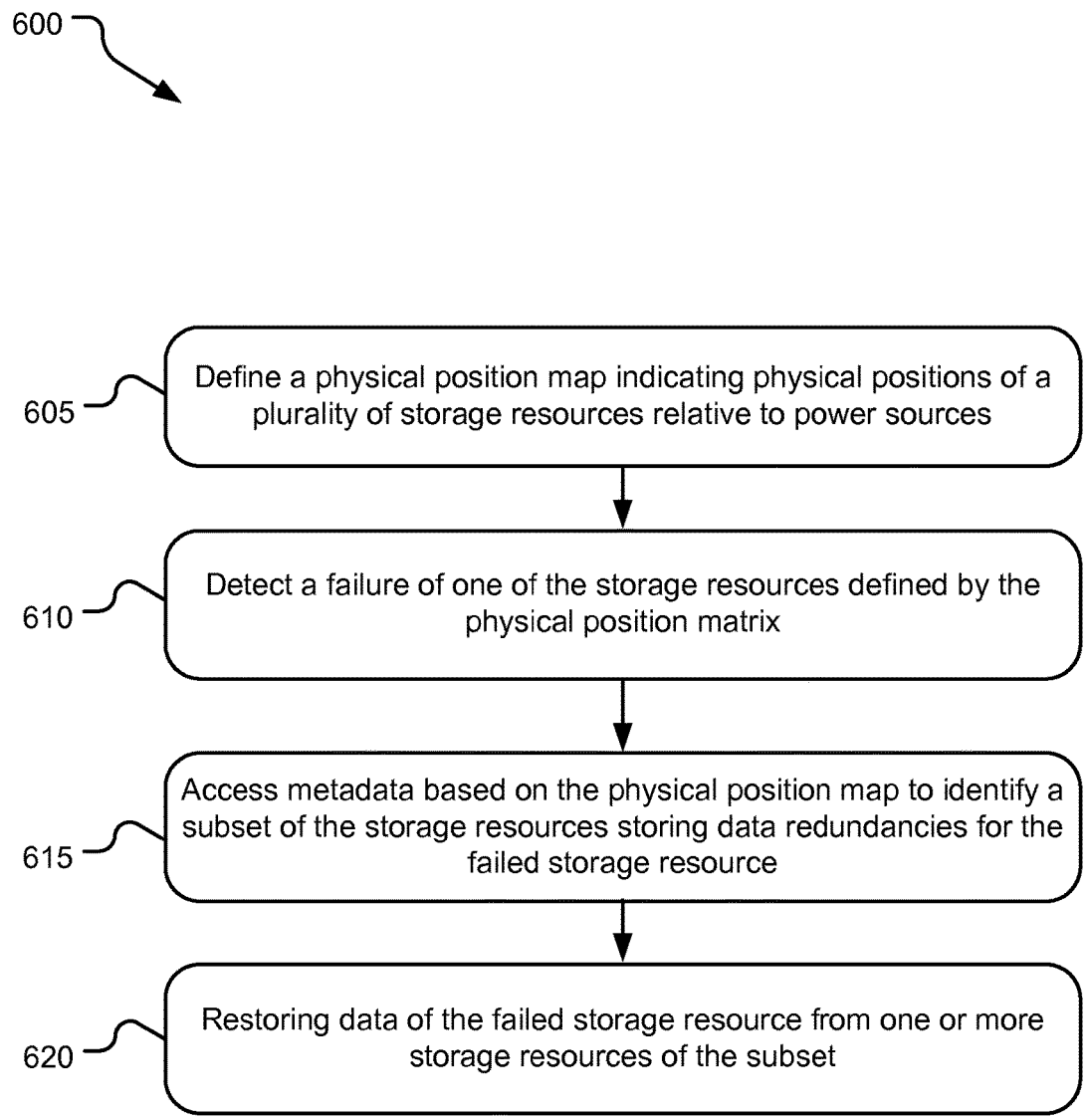
FIG. 6 illustrates example operations for reconstructing one or more storage resources of a mass data storage system.

FIG. 6 illustrates example operations 600 for reconstructing one or more storage resources of a field replaceable unit in a mass data storage system. A first defining operation 605 defines a physical position map (e.g., a matrix) indicating physical positions of a plurality of storage resources relative to power supply units in the mass data storage system. In some implementations, the physical position map also indicates physical positions of the plurality of storage resources relative to one another and/or to different field replaceable units in the mass data storage system.

A detection operation 610 detects a failed storage resource from among the plurality of storage resources. The term "failed storage resource" may refer to, for example, a storage resource that is intentionally or unintentionally taken off-line for repair or replacement. In some cases, the failed storage resource may be non-functional at the time it is taken off-line. In other cases, the failed storage resources may be fully functional when taken off-line. For example, a functional media unit may be intentionally ejected from the mass storage system to facilitate upgrade or component replacement.

An accessing operation 615 accesses metadata associated with the failed storage resource to identify a subset of the storage resources storing data redundancies for the failed storage resource. In one implementation, the subset includes storage resources powered by different power supply units than one another and/or the failed storage resource. The accessed metadata is saved in association with a physical or logical position of the failed resource. In one implementation, the metadata references positions on the physical position map corresponding to storage resources that store data redundancies for the failed storage resource. In another implementation, the metadata references logical rather than physical positions of storage resources storing the data redundancies for the failed storage resource. In both of these implementations, the metadata may be originally generated as a result of logical zoning of the physical position map based on resource distribution rules. Consequently, the metadata is itself "based on" the physical position map. A restoration operation 620 restores data of the failed storage resource from one or more storage resources of the identified subset.

Figure 7:
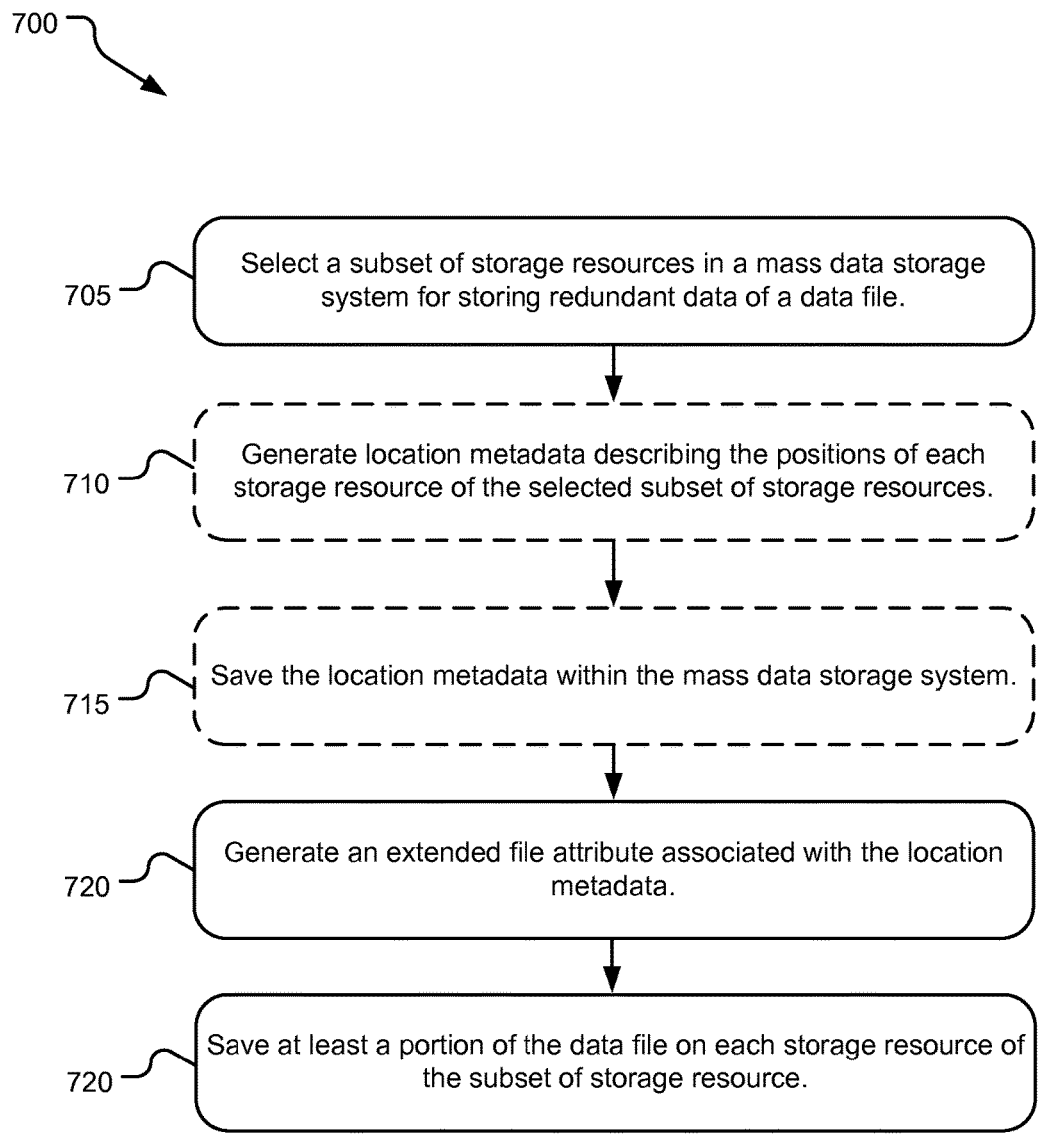
FIG. 7 illustrates example operations for generating and tracking data redundancies in a mass data storage system.

FIG. 7 illustrates example operations 700 for generating and tracking data redundancies in a mass data storage system. Responsive to receipt of a write command, a selection operation 705 selects a subset of storage resources for storing redundant data of a file specified by the write command. A generating operation 710 generates location metadata describing the physical and logical positions of each storage resource of the selected subset of storage resources. Location metadata describing a physical position of a storage resource may include, for example, a physical address of a media unit, a physical location of a media unit within a particular rack, an index of a storage resource within an individual unit, etc. In contrast, location metadata describing a logical position of a storage resource may include, for example, a World Wide media unit identifier and/or a logical index for an individual storage drive, a logical block address, etc.

A saving operation 715 saves the location metadata within the mass data storage system. In some implementations, the location metadata is redundantly saved on multiple devices. Another generation operation 720 generates at least on extended file attribute associated with the location metadata. In one implementation, the generated extended file attribute(s) include the location metadata. In another implementation, generated extended file attribute(s) include a pointer that points to the location metadata stored in a separate location. A saving operation 725 saves the data file (e.g., redundantly) to each storage resource of the subset of storage resources. The extended file attributes are saved in an index of a storage system interface (e.g., with file system indexing information).

The implementations of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A data storage system comprising:
a data manager that identifies a subset of storage resources in the data storage system for redundant storage of a data file and generates location metadata for the data file defining physical and logical positions of each storage resource in the subset of storage resources, the location metadata referencing a physical position map defining physical positions of the plurality of storage resources with respect to one another.

2. The data storage system of claim 1, wherein the data manager further generates an extended file attribute that acts as a pointer identifying a storage location of the location metadata.

3. The data storage system of claim 1, wherein the data manager saves the location metadata as one or more extended file attributes associated with the data file.

4. The data storage system of claim 1, wherein the plurality of storage resources are distributed across a number of different media units, each media unit including multiple drives with shared control electronics.

5. The data storage system of claim 1, wherein the location metadata includes a world wide media unit identifier for a media unit associated with each storage resource of the subset of storage resources.

6. The data storage system of claim 1, wherein the location metadata references a slot location within a particular rack for each storage resource of the subset of storage resources.

7. The data storage system of claim 1, wherein the location metadata includes an index identifying a physical drive position within a particular media unit for each storage resource of the subset of storage resources.

8. The data storage system of claim 1, wherein the location metadata includes a logical block address associated with each storage resource of the subset of storage resources.

9. A computer-readable storage media encoding a computer program for executing computer process on a computer system, the computer process comprising:

selecting a subset of hardware storage resources in a mass data storage system for redundant storage of a data file;

generating location metadata referencing positions of each of the selected hardware storage resources of the subset, the location metadata referencing a physical position map defining physical positions of the plurality of storage resources with respect to one another;

generating at least one extended file attribute for the data file associated with the location metadata; and saving at least a portion of the data file on each storage resource of the subset of select hardware storage resources.

10. The computer-readable storage media of claim 9, wherein the at least one extended file attribute is a pointer identifying a storage location of the location metadata.

11. The computer-readable storage media of claim 9, wherein the at least one extended file attribute includes the location metadata.

12. The computer-readable storage media of claim 9, wherein the subset of hardware storage resources are distributed across a number of different media units, each media unit including multiple drives with shared control electronics.

13. The computer-readable storage media of claim 9, wherein the location metadata includes a world wide media unit identifier for a media unit associated with each storage resource of the subset of hardware storage resources.

14. The computer-readable storage media of claim 9, wherein the location metadata references a slot location within a particular rack for each storage resource of the subset of hardware storage resources.

15. The computer-readable storage media of claim 9, wherein the location metadata includes an index identifying a physical drive position within a particular media unit associated with each storage resource of the subset of hardware storage resources.

16. The computer-readable storage media of claim 10, wherein the location metadata includes a logical block address associated with each storage resource of the subset of hardware storage resources.

17. The computer-readable storage media of claim 10, wherein the location metadata includes a length indicator indicating a length of saved data for each storage resource of the subset of hardware storage resources.

18. A non-transitory computer-readable storage media encoding a computer program for executing computer process on a computer system, the computer process comprising:

selecting a subset of storage resources in a mass data storage system for storage of a data file;

generating and saving location metadata describing positions of each storage resource of the subset of storage resources, the location metadata referencing a physical position map defining physical positions of the storage resources with respect to one another; and generating an extended file attribute for the data file that acts as a pointer to the saved location metadata.

19. The computer-readable storage media of claim 18, wherein the location metadata is distributed across multiple storage resources.

* * * * *